Sept. 29, 1959     W. H. ROWE     2,906,480
PALLET
Filed Nov. 5, 1954
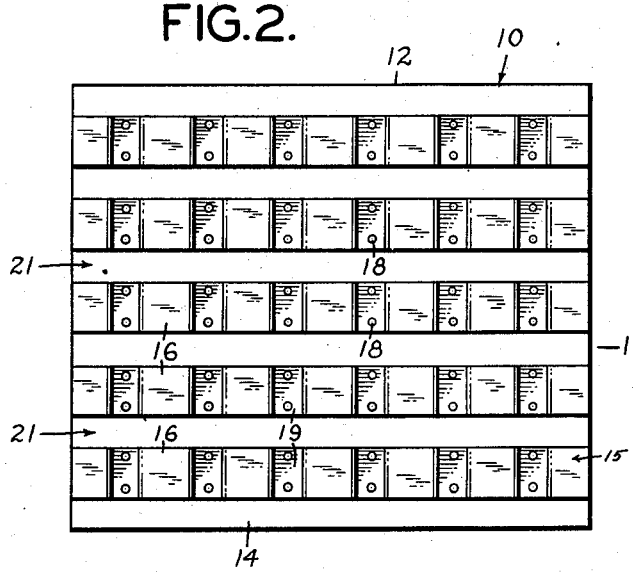
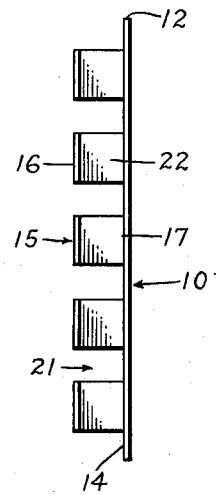
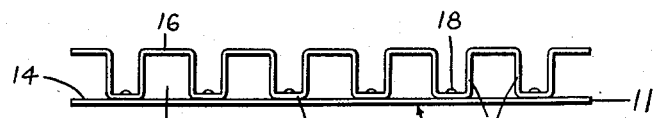
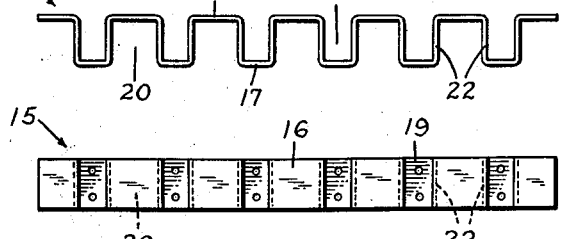
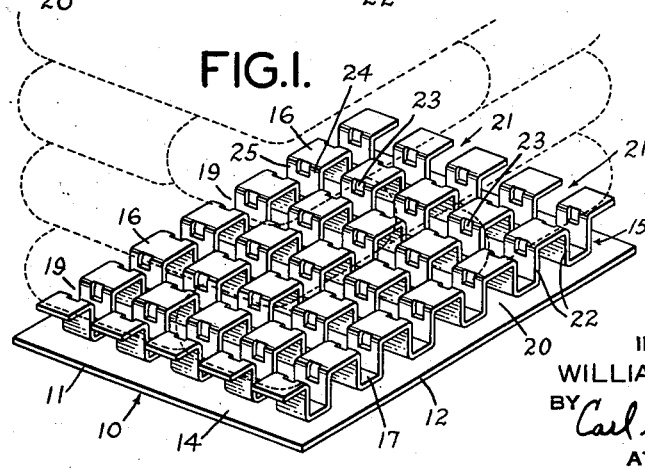
INVENTOR
WILLIAM H. ROWE
BY
ATTORNEY

# United States Patent Office 2,906,480
Patented Sept. 29, 1959

2,906,480

PALLET

William H. Rowe, Ridgewood, N.J., assignor to Allied Chemical Corporation, a corporation of New York Application November 5, 1954, Serial No. 467,144

5 Claims. (Cl. 248—120)

This invention relates to pallets. It is concerned with a pallet construction for use in connection with material handling devices such as industrial fork trucks and the like. More particularly it relates to four way take-it-or-leave-it pallets i.e. pallets so constructed that a superposed load may be lifted from the pallet from any one of the four edges thereof either integrally with the pallet or separately therefrom.

The use of fork lift trucks to transfer boxes or bags is well known in industrial operations. Typically these packages are conveniently handled in large quantities by use of pallets which colligate selected groups of packages for ready handling in convenient form. Conventional pallets heretofore employed for storage or shipping purposes have been fabricated from a pair of flat surfaces separated by a plurality of parallel stringers or spacing boards. One surface serves as the upper load-supporting surface and the other serves as the lower floor-contacting surface. In order to move either the loaded or unloaded pallet, a conventional fork lift truck having two spaced forks is used. The forks of the truck may be inserted in direction parallel to the spacing boards of the pallet and between the upper load-supporting surface and the lower floor-contacting surface. Elevating the forks, raises the pallet and supported load, if any, above the floor and in this position it may be readily and conveniently transported to desired destination. Upon arrival at destination the pallet may be set down with its accompanying load.

When using the standard pallet above described, the load rests securely on the upper surface of the same. There is no space between the pallet and the load. Because of this characteristic of the particular structure of the standard pallet, the forks of the lift truck may not be inserted between the load and the pallet to remove the load without danger of spilling the load, ripping the bags, etc. Because of this factor, it has sometimes been convenient once a pallet has been loaded, to deliver it to the shipper and to transport the loaded pallet to the ultimate user who will handle and store the load on the pallet. Unless the pallet and load are shipped and otherwise handled in this manner, it is necessary to manually remove the bags from the pallet each time a transfer is made.

It is apparent that either technique is costly. If the pallet is forwarded with the load the problem of further use of the same at its destination or of paying cost of retaining or returning the same to the point of shipment is to be considered. The necessity for manually unloading the pallet either at shipping point or destination also constitutes an undesirable expense and is time consuming.

Attempts have heretofore been made to fabricate pallets which did not suffer the noted disadvantages. Such pallets have not found acceptance because they suffered from many disadvantages including difficulty of fabrication, cost of construction, lack of durability, difficulty of handling, limited adaptability for both highway truck and rail shipment, etc.

It is an object of this invention to provide a pallet which may itself be lifted with load thereon and from which the superposed load may readily be removed by a fork lift truck from any of the four sides of the pallet.

It is a further object of this invention to provide a sturdy pallet construction of high strength which may be easily and inexpensively fabricated.

Other objects will be apparent to those skilled-in-the-art on inspection of the accompanying drawing and following detailed description.

This invention in certain of its aspects comprises a pallet adapted to support a load and comprising a flat, structurally rigid, supporting baseboard, a plurality of attenuated corrugated spaced strips mounted on the upper surface of said baseboard, each strip having a plurality of flat, parallel, coplanar load-supporting surfaces and a corresponding plurality of flat, parallel, coplanar board-engaging surfaces, each of said load-supporting surfaces being spaced from said board engaging surfaces by two upstanding integral preferably bifurcated portions of said strip, the length of said load-supporting surfaces and of the spacing thereunder being such that the forks of a fork lift truck may be inserted thereunder whereby the pallet may be lifted, the length of each of said board-engaging surfaces and the spacing thereover being such that forks may be inserted thereover whereby a load may be lifted free of the pallet, the spacing between each adjacent pair of attenuated corrugated strips and between selected strips being such that forks may be inserted between the selected strips thereof whereby a load may be lifted from said pallet.

The pallet of this invention is characterized by inexpensiveness and ease of fabrication and by long service life. It is inherently strong, durable, and extremely resistant to the attrition experienced during normal usage. Furthermore these pallets may readily be stored in a very small space.

The fork-lift truck, with which the pallet of this invention is intended to be employed, bears two or more forks. Each of these forks typically is 1 to 6 inches, say 2 inches in width and 36 to 48 inches, say 46 inches long. The forks may range in thickness from $\frac{1}{16}$ to $\frac{1}{4}$ inch, say $\frac{1}{8}$ inch at their thinnest forward edge to as much as 1 to 3 inches, say 2 inches at their thicker rear edge. The center-to-center spacing between forks may be 4 to 30 inches, typically 7⅝ inches.

In the drawings:

Figure 1 is an isometric view of the preferred embodiment of the pallet;

Figure 2 represents a plan view of an alternative embodiment of this invention;

Figure 3 is a side elevation of the embodiment of Figure 2;

Figure 4 is an end elevation of the embodiment of the invention shown in Figure 2;

Figure 5 is a side elevation of one of the strips shown in Figure 2;

Figure 6 is a plan view of the strip of Figure 5.

In a preferred form of construction as shown in the drawing, a board 10 which may be of multi-ply plywood, typically five-ply plywood of 0.625 inch thickness, may be of any suitable outside dimension. There may be a longer edge 12 and a shorter edge 11 although the two may be the same length if desired for the particular purpose. Preferably however the dimensions 40 inches by 48 inches are employed, as this permits suitable placing of these unit loads two abreast with the 40" dimension across in a standard sized truck which is approximately 88 inches wide inside dimension, and also two abreast with the 48" dimension across in a standard sized box car which is 110 inches wide inside, leaving in each case some extra space for necessary clearance.

Mounted on the upper face 14 of the sheeting either parallel to the longer side 12 of the baseboard 10 as shown in Figures 1 or 2, or parallel to the shorter side 11, is a plurality of corrugated strips 15. A typical strip shown in Figures 5 and 6 may be formed of metal, preferably sheet metal. Sheet steel of 16 to 8 gauge, say #13 has been found to be satisfactory. Each strip 15 may be formed from a flat attenuated blank of sheet steel of a desirable width, preferably 3 to 8 inches, say 4½ inches. The blank is bent to form the strip 15 in such manner that there is formed a plurality of parallel, coplanar, load-supporting surfaces 16 and a plurality of parallel, coplanar board-engaging surfaces 17. The plane of the load-supporting surfaces 16 is preferably displaced from and parallel to the plane of the board-engaging surfaces 17. Each load-supporting surface 16 is supported by two upstanding support portions 22 of the strip 15. It will be understood that because of the method of fabrication, the load-supporting portions 16 of the strip 15, the board-engaging portions 17, and the support portions 22 are all integral parts of continuous corrugated sheet 15 formed from a single blank. Preferably the support portions 22 are substantially perpendicular to the planes of the surfaces 16 and the surfaces 17.

In the preferred embodiment as shown in Figure 1, each strip 15 may be perforated by a plurality of perforations 23 so positioned as to fall within each upstanding support portion 22 of the strip 15 and to bifurcate at least a portion of the same, i.e. each support portion 22 will be divided to form two separate support portions 24 and 25. The particular size of the perforations 23 i.e. the spacing of portions 24 and 25 will be at least sufficient to permit insertion therein of a fork of a fork lift truck. Preferably the perforations will extend up to the surface 16, so that the fork when inserted and raised will bear on the undersurface of the load-supporting surfaces 16. All of the perforations 23 in a strip will be positioned so that the fork may pass through the entire strip and thereby lift the pallet.

The overall length of the load-engaging surface 16 i.e. the spacing between supporting portions 22 immediately coterminous with the same, will be at least sufficient to permit entry under surface 16 and between corresponding portions 22 of a tine of a fork of a fork-lift truck. Preferably this spacing will be at least 1½ inches, and typically will be 3 to 8 inches, say 4 inches. The length may be greater if the load requirements or other criteria so dictate. Similarly the length of surface 17, i.e. the spacing between supporting portions 22 immediately coterminous with the same, will be at least sufficient to permit entry over surface 17 and between corresponding portions 22 of a fork of a fork-lift truck. Preferably this spacing will be at least 1½ inches, and typically will be 2 to 6 inches, say 2.125 inches.

The distance between selected pairs of load-supporting surfaces and between selected pairs of board-engaging surfaces will preferably be such that the forks of the fork-lift truck will fit respectively under and over the said surfaces. A preferred center-to-center distance for either of these spacings may be 4 to 30 inches, say 7⅝ inches.

Height of the load-supporting platform 16 above the board-engaging surface 17, i.e. the length of portions 22, may be conveniently selected. Preferred dimensions are at least 2 inches, say 3 to 6 inches, typically 4.5 inches.

Each of the strips 15 is mounted on the upper face 14 of board 10 preferably by fastening means 18 as screws securing board-engaging surfaces 17 to the face 14 of the board.

The spacing between adjacent strips is at least as wide as the width of a fork, typically at least 1½ inches, and may be 1½ to 8 inches, say 3⅛ inches.

The preferred spacing between selected pairs of strips is such that the forks may be simultaneously placed in the rows between the strips. A spacing such that the centers of the rows between the strips is from 4 to 30 inches, say 7⅝ inches is satisfactory.

In a particular pallet constructed according to one embodiment of this invention, the board 10 was a 0.625 inch thick five-ply piece of sheeting grade fir plywood joined by waterproof glue. Each strip 15 was formed by corrugating a piece of #13 gauge (0.0897 inch) sheet steel 4½ inches wide to form a series of load-supporting surfaces 16 each four inches long and a series of board-engaging surfaces 17 each 2.125 inches long. The support sections 22 were each 4.5 inches long and all corners were bent around a 0.25 inch radius. Distance from the center of one board-engaging surface to the center of the next was 7.625 inches.

Five of these strips, each of overall length of 48 inches were screwed to the upper face 14 of board 10, each strip being parallel to each other and to the 48 inch longer edge 12 of board 10.

This pallet as so constructed was found to be readily capable of supporting a typical load such as 20 bags containing 100 pounds per bag or a total weight per pallet of 2000 pounds. Because of the unique configuration of the pallet, it is possible to lift the bags from the pallet from any of the four edges. It is also possible to lift the loaded pallet from each of the four edges.

It will be readily apparent to those skilled-in-the-art that modifications may be made in the particular details of the pallet construction which will fall within the scope of the invention as defined by the following claims.

I claim:

1. A pallet adapted to support a load which may be readily lifted therefrom by the forks of a fork-lift truck from each of the four edges of the pallet comprising a flat, structurally rigid, supporting baseboard, a plurality of attenuated corrugated spaced strips mounted on the upper surface of said baseboard, each strip having a plurality of flat, parallel, coplanar, load-supporting surfaces and a corresponding plurality of flat, parallel, coplanar, baseboard-engaging surfaces, each of said load-supporting surfaces being spaced from said baseboard-engaging surfaces by two upstanding portions of said strip, the length of each of said load-supporting surfaces and of the spacing thereunder being such that the forks of a fork-lift truck may be inserted under selected load-supporting surfaces whereby the pallet may be lifted, the length of each of said baseboard-engaging surfaces and of the spacing thereover being such that lift forks may be inserted over selected baseboard-engaging surfaces whereby a load may be lifted free of the pallet, the spacing between adjacent attenuated corrugated strips being such that lift forks may be inserted therebetween whereby a load may be lifted from said pallet.

2. A pallet adapted to support a load which may be readily lifted therefrom by the forks of a fork-lift truck from each of the four edges of the pallet comprising a flat, structurally rigid, supporting wooden baseboard, a plurality of attenuated corrugated spaced metal strips mounted on an upper surface of said baseboard, each strip having a plurality of flat, parallel, coplanar, load-supporting surfaces and a corresponding plurality of flat, parallel, coplanar baseboard-engaging surfaces, each of said load-supporting surfaces being spaced from said baseboard-engaging surfaces by two upstanding portions of said strip, the length of each of said load supporting surfaces and of the spacing thereunder being such that the forks of a fork-lift truck may be inserted under selected load supporting surfaces whereby the pallet may be lifted, the length of each of said baseboard-engaging surfaces and of the spacing thereover being such that a lift fork may be inserted over selected baseboard-engaging surfaces whereby a load may be lifted free of the pallet, the spacing between adjacent attenuated corrugated strips being such that lift forks may be inserted therebetween whereby a load may be lifted from said pallet.

3. A pallet adapted to support a load which may be readily lifted therefrom by the forks of a fork-lift truck from each of the four edges of the pallet comprising a flat, structurally rigid, supporting baseboard, a plurality of attenuated corrugated spaced strips mounted on an upper surface of said baseboard, each strip having a plurality of flat, parallel, coplanar, load-supporting surfaces and a corresponding plurality of flat, parallel, coplanar, board-engaging surfaces, each of said load supporting surfaces being spaced from said baseboard-engaging surfaces by two upstanding portions of said strip substantially perpendicular to the planes of said load-supporting surfaces and said board-engaging surfaces, the length of each of said load-supporting surfaces and of the spacing thereunder being such that the forks of a fork-lift truck may be inserted under selected load supporting surfaces whereby the pallet may be lifted, the length of each of said baseboard-engaging surfaces and of the spacing thereover being such that lift forks may be inserted over selected board engaging surfaces whereby a load may be lifted free of the pallet, the spacing between adjacent corrugated strips being such that lift forks may be inserted therebetween whereby a load may be lifted from said pallet.

4. A pallet adapted to support a load as claimed in claim 1 wherein adjacent upstanding portions of at least two strips contain aligned perforations to receive the fork of a fork-lift truck.

5. A pallet adapted to support a load as claimed in claim 4 wherein the aligned perforations are immediately adjacent to the jointures of the upstanding portions with the load-supporting surfaces of the strips to receive the fork of the fork-lift truck in engagement with the under side of said load-supporting surface.

References Cited in the file of this patent

UNITED STATES PATENTS

| | | |
|---|---|---|
| 137,502 | Stevens | Apr. 11, 1873 |
| 1,271,413 | Allen | July 2, 1918 |
| 1,922,560 | Sullivan | Aug. 15, 1933 |
| 2,412,184 | Ulinski | Dec. 3, 1946 |
| 2,455,197 | Sullivan | Nov. 30, 1948 |
| 2,506,346 | Crawford | May 2, 1950 |
| 2,509,682 | Golrick | May 30, 1950 |
| 2,544,743 | Vrabcak | Mar. 13, 1951 |
| 2,685,398 | King | Aug. 3, 1954 |